(12) United States Patent
Restelli et al.

(10) Patent No.: US 12,430,548 B2
(45) Date of Patent: Sep. 30, 2025

(54) VARIABLE SENSITIVITY NODE

(71) Applicant: University of Maryland, College Park, College Park, MD (US)

(72) Inventors: Alessandro Restelli, Greenbelt, MD (US); Daniel P. Lathrop, University Park, MD (US); Heidi Komkov, Albuquerque, NM (US)

(73) Assignee: University of Maryland, College Park, MD (US)

( * ) Notice: Subject to any disclaimer, the term of this patent is extended or adjusted under 35 U.S.C. 154(b) by 1051 days.

(21) Appl. No.: 17/208,399

(22) Filed: Mar. 22, 2021

(65) Prior Publication Data

US 2021/0295144 A1    Sep. 23, 2021

Related U.S. Application Data

(60) Provisional application No. 62/992,326, filed on Mar. 20, 2020.

(51) Int. Cl.
*G06N 3/065* (2023.01)
*G06N 3/063* (2023.01)
*G06N 3/08* (2023.01)

(52) U.S. Cl.
CPC .............. *G06N 3/065* (2023.01); *G06N 3/063* (2013.01); *G06N 3/08* (2013.01)

(58) Field of Classification Search
CPC ................................ G06N 3/065; G06N 3/063
See application file for complete search history.

(56) References Cited

U.S. PATENT DOCUMENTS

| | | | | |
|---|---|---|---|---|
| 2005/0234839 | A1* | 10/2005 | Haudrich | G06N 3/10 702/33 |
| 2018/0174023 | A1* | 6/2018 | Imam | G06N 3/063 |
| 2019/0325309 | A1* | 10/2019 | Flamant | G06N 3/045 |
| 2021/0406648 | A1* | 12/2021 | Lathrop | G06N 3/08 |

FOREIGN PATENT DOCUMENTS

WO    WO-2018213399 A1 * 11/2018 ........... G06N 3/0445

OTHER PUBLICATIONS

Nicolae Lobontiu, System Dynamics for Engineering Students, Mar. 19, 2010, Academic Press, pp. 253-307 (Year: 2010).*

(Continued)

*Primary Examiner* — Casey R. Garner
(74) *Attorney, Agent, or Firm* — Quarles & Brady LLP; Yakov S. Sidorin (57) ABSTRACT

A variable sensitivity node for a neural network that can be implemented as an information processing device such as an ASIC, and can be adjusted simply by applying immediate weights or parameters that change and/or amplify or de-amplify the output of the nodes. The information processing device has one or more nodes each with an input setting channel, a logic element configured to translate the input signal into the output signal based on a mathematical function that includes a parameter setting, and a parameter-setting element configured to set the parameter setting based on a control input to the input setting channel, thereby altering the mathematical relationship of the logic element without compromising speed and efficiency.

28 Claims, 7 Drawing Sheets

(56) References Cited

OTHER PUBLICATIONS

L. Larger, A. Bayl'on-Fuentes, R. Martinenghi, V. S. Udaltsov, Y. K. Chembo, and M. Jacquot, "High-speed photonic reservoir computing using a time-delaybased architecture: Million words per second classification," Physical Review X, vol. 7, No. 1, 2017.

D. M. Canaday, Modeling and Control of Dynamical Systems with Reservoir Computing. Doctoral thesis, Ohio State University, 2019.

A. Vandesompele, G. Urbain, F. Wyffels, and J. Dambre, "Populations of spiking neurons for reservoir computing: Closed loop control of a compliant quadruped," Cognitive Systems Research, vol. 58, pp. 317-323, Dec. 2019.

H. Soh and Y. Demiris, "Iterative temporal learning and prediction with the sparse online echo state gaussian process," Proceedings of the International Joint Conference on Neural Networks, pp. 10-15, 2012.

L. Appeltant, M. C. Soriano, G. Van der Sande, J. Danckaert, S. Massar, et al., "Information processing using a single dynamical node as complex system," Nature Communications, vol. 2, p. 468, Sep. 2011.

J. D. Hart, L. Larger, T. E. Murphy, and R. Roy, "Delayed dynamical systems: Networks, chimeras and reservoir computing," Philosophical Transactions of the Royal Society A: Mathematical, Physical and Engineering Sciences, vol. 377, No. 2153, 2019.

D. Brunner, B. Penkovsky, B. A. Marquez, M. Jacquot, I. Fischer, and L. Larger, "Tutorial: Photonic neural networks in delay systems," Journal of Applied Physics, vol. 124, No. 15, p. 152004, 2018. 152.

J. Tang, C. Deng, and G. B. Huang, "Extreme Learning Machine for Multilayer Perceptron," IEEE Transactions on Neural Networks and Learning Systems, vol. 27, No. 4, (2016): 13 pages.

G. Tanaka, T. Yamane, J. B. H'eroux, R. Nakane, N. Kanazawa, S. Takeda, H. Numata, D. Nakano, and A. Hirose, "Recent advances in physical reservoir computing: A review," Neural Networks, vol. 115, pp. 100-123, Jul. 2019.

C. G. Langton, "Computation at the edge of chaos: Phase transitions and emergent computation," Physica D: Nonlinear Phenomena, vol. 42, No. 1, pp. 12-37, 1990.

L. Cocchi, L. L. Gollo, A. Zalesky, and M. Breakspear, "Criticality in the brain: A synthesis of neurobiology, models and cognition," 2017.

K. Nakajima, H. Hauser, T. Li, and R. Pfeifer, "Information processing via physical soft body," Scientific Reports, vol. 5, pp. 1-11, 2015.

V. C. Muller and M. Hoffmann, "What Is Morphological Computation? On How the Body Contributes to Cognition and Control," Artificial Life, vol. 23, No. 1, pp. 1-24, 2017.

H. Hauser, A. J. Ijspeert, R. M. Fuchslin, R. Pfeifer, and W. Maass, "Towards a theoretical foundation for morphological computation with compliant bodies," Biological Cybernetics, vol. 105, No. 5-6, pp. 355-370, 2011.

G. Dion, S. Mejaouri, and J. Sylvestre, "Reservoir computing with a single delay-coupled non-linear mechanical oscillator," Journal of Applied Physics, vol. 124, p. 152132, Oct. 2018.

K. Caluwaerts, M. D'Haene, D. Verstraeten, and B. Schrauwen, "Locomotion without a brain: Physical reservoir computing in Tensegrity structures," Artificial Life, vol. 19, (2013): 33 pages.

C. Fernando and S. Sojakka, "Pattern Recognition in a Bucket," in Advances in Artificial Life (W. Banzhaf, J. Ziegler, T. Christaller, p. Dittrich, and J. T. Kim, eds.), vol. 2801, (Berlin, Heidelberg), pp. 588-597, Springer Berlin Heidelberg, 2003.

X. Sui, et al., "A review of optical neural networks," IEEE Access, vol. 8, (2020) pp. 70773-70783,.

J. M. Shainline, "The Largest Cognitive Systems Will be Optoelectronic," 2018 IEEE International Conference on Rebooting Computing, ICRC 2018, pp. 1-10, 2019. 153.

J. M. Shainline, "The Largest Cognitive Systems Will be Optoelectronic," 2018 IEEE International Conference on Rebooting Computing, ICRC 2018, (2019): 11 pages.

F. Laporte, J. Dambre, and p. Bienstman, "Neuromorphic Computing with Signal-Mixing Cavities," 2018 IEEE International Conference on Rebooting Computing (ICRC), pp. 1-4, 2019.

D. Brunner and I. Fischer, "Reconfigurable semiconductor laser networks based on diffractive coupling," Optics Letters, vol. 40, No. 16, p. 3854, (2015). 4 pages.

G. Van Der Sande, D. Brunner, and M. C. Soriano, "Advances in photonic reservoir computing," Nanophotonics, vol. 6, No. 3, pp. 561-576, 2017.

B. Schrauwen, M. D'Haene, D. Verstraeten, J. Van Campenhout, and J. V. Campenhout, "Compact hardware liquid state machines on FPGA for realtime speech recognition," Neural Networks, vol. 21, No. 2-3, pp. 511-523, 2008.

B. Penkovsky, L. Larger, and D. Brunner, "Efficient design of hardwareenabled reservoir computing in FPGAs," Journal of Applied Physics, vol. 124, No. 16, p. 162101, 2018.

M. C. Soriano, S. Ortin, L. Keuninckx, L. Appeltant, J. Danckaert, L. Pesquera, G. der Sande, S. Ort'n, L. Keuninckx, L. Appeltant, J. Danckaert, L. Pesquera, and G. V. D. Sande, "Delay-Based Reservoir Computing: Noise Effects in a Combined Analog and Digital Implementation," IEEE transactions on neural networks and learning systems, vol. 26, No. 2, pp. 388-393, 2015.

J. H. Jensen and G. Tufte, "Reservoir Computing with a Chaotic Circuit," in Artificial Life, No. September, pp. 222-229, MIT Press, 2017.

M. L. Alomar, V. Canals, N. Perez-Mora, V. Mart'nez-Moll, and J. L. Rossell'o, "FPGA-Based Stochastic Echo State Networks for Time-Series Forecasting," Computational Intelligence and Neuroscience, p. 3917892, 2016.

N. D. Haynes, M. C. Soriano, D. P. Rosin, I. Fischer, and D. J. Gauthier, "Reservoir computingautonomous Boolean node," Physical Review E, vol. 91, No. 2, p. 20801, 2015.

\* cited by examiner

VARIABLE SENSITIVITY NODE

CROSS-REFERENCE TO RELATED APPLICATIONS

The present application derives priority from U.S. Provisional Patent Application 62/992,326 filed 20 Mar. 2020.

STATEMENT REGARDING FEDERALLY SPONSORED RESEARCH

This invention was made with government support under H9823019D00030013 awarded by the National Security Agency. The government has certain rights in the invention.

BACKGROUND OF THE INVENTION

1. Field of the Invention

The present invention relates generally to artificial neural networks ("ANN"s) and, more particularly, to a variable sensitivity node for a neural network that can be implemented as an information processing device such as an ASIC, and can be adjusted simply by applying immediate weights or parameters that change and/or amplify or de-amplify the output of the nodes.

2. Description of the Background

Neural networks are typically comprised of multiple layers of multiple nodes. Each node (also called an artificial neuron), is a computational unit that has one or more weighted input connections, a transfer function that combines the inputs in some way, and an output connection. The transfer functions of nodes within an ANN can influence the internal behavior of the ANN and its output. The transfer function is a function that maps a set of input signals to a set of output signals for that node.

When neural networks emerged in the late 1980's, two kinds of transfer functions were most often used: the logistic (sigmoid) function and the hyperbolic tangent (tanh) function. Both of these functions are continuous (smooth), monotonically increasing, and bounded. The sigmoid function is bounded between 0 and 1, and the hyperbolic tangent (tanh) function is bounded between −1 and 1. More complex transfer functions have since evolved that are not smooth or bounded.

In all such cases the transfer functions require parameters or 'settings' such as coefficients, multipliers, weights, etc., that can change the transfer function of the node. Transfer function settings can be determined quantitatively. For example, the settings for a node can be determined from the back-propagation of signals across the ANN using neural network optimization techniques, such as gradient descent optimization. The determined transfer function settings can be applied to the transfer function of the node to change the transfer function and thus the behavior of the node in a desired manner.

ANNs can be implemented in hard-wired, integrated circuits, such as application specific integrated circuits ("ASICs"), where distinct subsets of circuitry within the ASIC can define the nodes that make up the ANN. It would be greatly advantageous to be able to store configurable transfer function settings such as weights at the nodes themselves. This way, the transfer functions of each node in an ASIC-implemented ANN could be adjusted by applying immediate weights that selectively amplify or de-amplify the output of the nodes, thereby increasing the speed of processing of signals propagating through the ANN.

According to embodiments of this disclosure, to address the issues discussed above, the transfer function of each node in an ANN can be adjusted by a specific transfer function setting, and the transfer function setting is stored in a memory element resident in each respective node in the ANN. The setting can be varied based on a setting signal received via a setting channel. Each node can include a set of input channels that are coupled to a transfer function element. The transfer function element may operate on input signals from the input channels and the transfer function setting to determine the output signal of the node in accordance with the node's transfer function.

SUMMARY OF THE INVENTION

It is a primary object of the invention to provide an ASIC-implemented neural network that can be adjusted simply by applying immediate weights or parameters that change and/or amplify or de-amplify the output of the nodes, thereby increasing the speed of processing of signals propagating through the ANN.

According to the present invention there is provided an information processing device such as an application-specific integrated circuit (ASIC) configured as a variable sensitivity node in a neural network having a plurality of network input channels and a network output channel. The information processing device has an input setting channel, a logic element configured to translate the input signal into the output signal based on a mathematical function that includes a parameter setting. In addition, the device includes an on-board parameter-setting element configured to set the parameter setting based on a control input to the input setting channel. A predetermined input to the input setting channel sets the parameter setting and alters the mathematical relationship of said logic element. The parameter setting element may be a memory circuit connected to the input setting channel, in communication with the logic element, and configured to store one or more values for determination of the parameter setting. The transfer function element may comprise logic gates configured to perform a logical operation. A plurality of such logic elements may be configured as an ASIC, all connected to a common parameter setting channel, and yet each being individually-addressable. The foregoing construct avoids reliance on peripheral processing and memories to change the transfer function, and greatly increases the speed and efficiency of the neural network.

BRIEF DESCRIPTION OF THE DRAWINGS a. Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Figure 1:
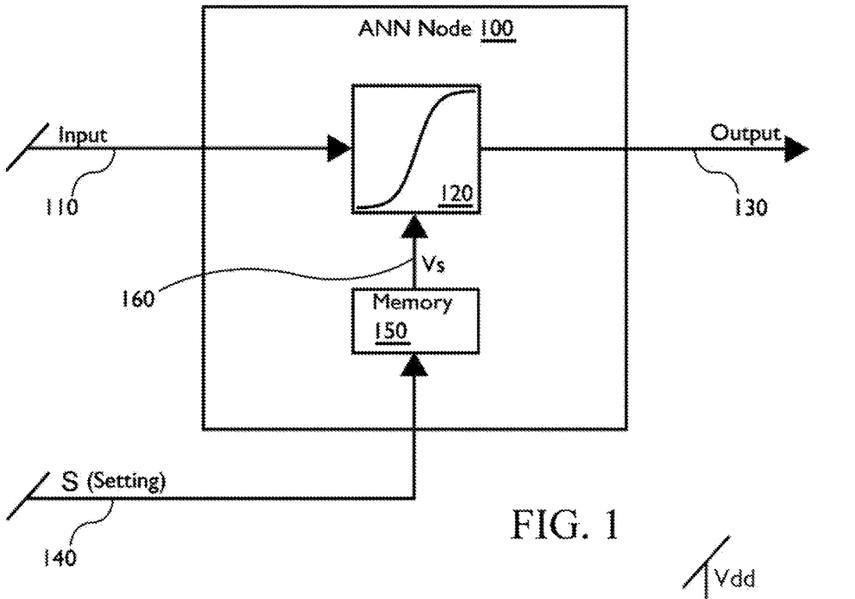
FIG. 1 shows a diagram of an example variable sensitivity node, according to embodiments of this disclosure.
Figure 2:
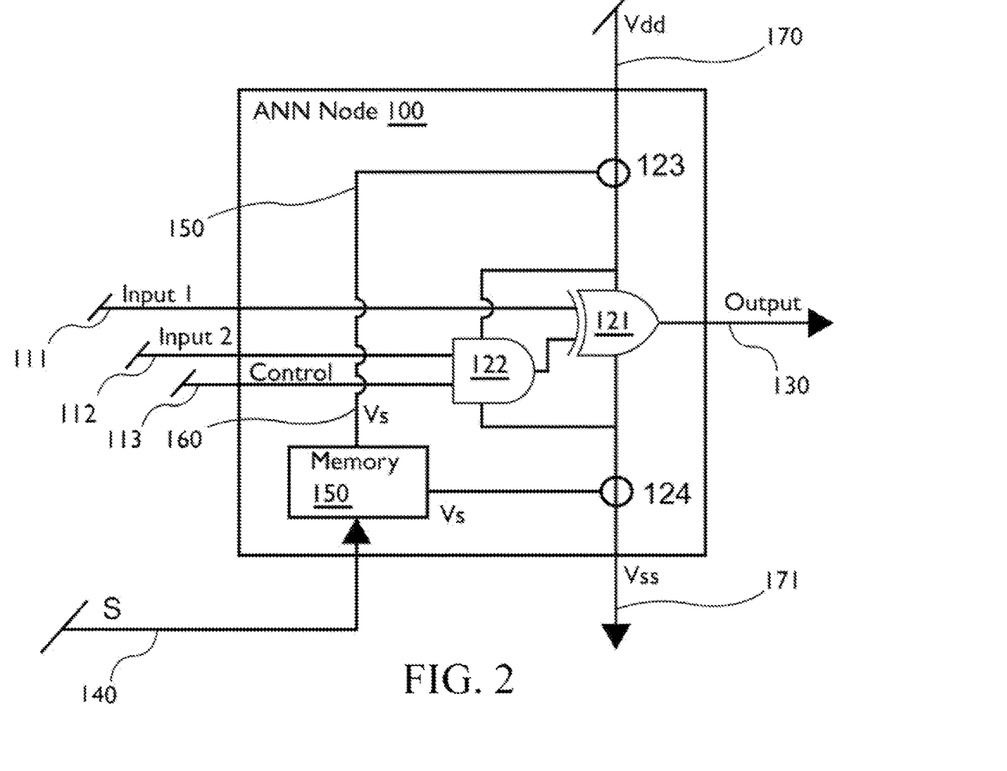
FIG. 2 shows a diagram of example circuitry of a variable sensitivity node, according to embodiments of this disclosure.
Figure 3:
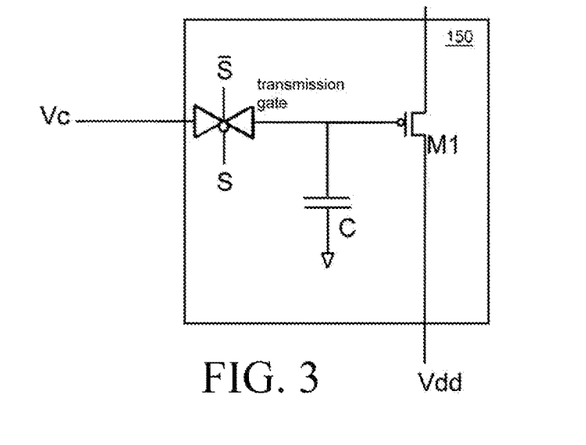
FIG. 3 shows a diagram of an example memory element, according to embodiments of this disclosure.
Figure 4:
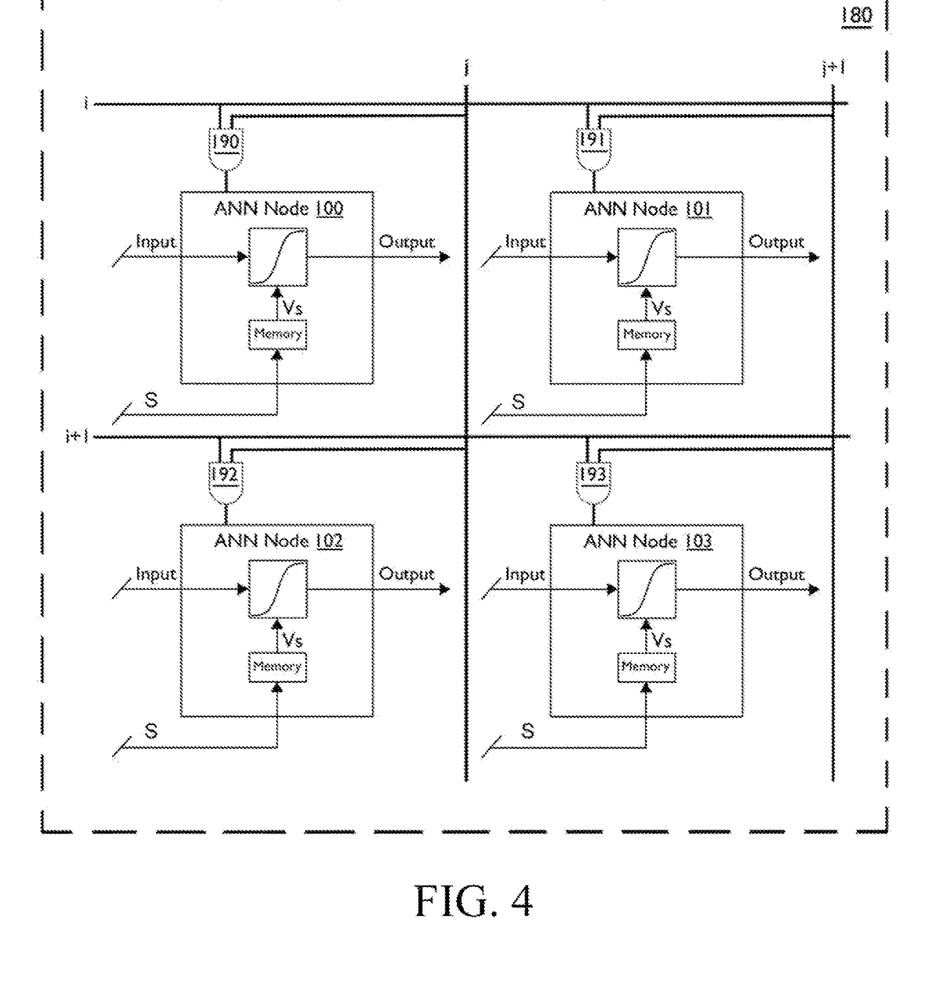
FIG. 4 shows a diagram of an example array of variable sensitivity nodes, according to embodiments of this disclosure.

The present invention is a variable sensitivity node for a neural network that can be implemented as an information processing device such as an ASIC. The variable sensitivity node can be adjusted simply by applying immediate weights or parameters that change and/or amplify or de-amplify the output of the nodes. The information processing device may have multiple nodes each having an input setting channel, a logic element configured to translate a signal input on the input setting channel into an output signal based on a mathematical function that includes a parameter setting, and a parameter-setting element configured to set the parameter setting based on a control input to the input setting channel, thereby altering the mathematical relationship of the logic element.

a. The variable sensitivity node, according to embodiments of this disclosure, can have a variety of circuit architectures including ASIC as described above. In general, variable sensitivity nodes can include any combination of circuitry suitable to perform linear and/or nonlinear operations on input signals as will be described.

b. For example, FIG. 1 shows a diagram of an example variable sensitivity node 100 according to an embodiment of the invention. ANN Node 100 can include one or more input channels 110 and output channels 130, all coupled to transfer function element 120. Input channels 110 and output channels 130 can be coupled to other nodes of the ANN, inputs to the ANN as a whole, or outputs of the ANN as a whole. Channels of node 100 and other coupling components can be formed from any substance suitable for connecting elements of node 100, such as copper, polysilicon, organic compounds (carbon nanotubes or other conducting nanomaterials), or aluminum wires or lines. Transfer function element 120 can operate on input signals from input channel 110 in accordance with a transfer function to determine the output of node 100. Node 100 also includes a memory element 150 connected to transfer function element 120, and a setting channel 140 coupled to memory element 150. Memory element 150 can be coupled to transfer function element 120 via setting input channel 160. In accordance with the invention, the transfer function of transfer function element 120 can be changed by a setting signal Vs received from memory element 150 on channel 160. The setting signal Vs output from memory element 150 may be selected via a setting signal S input to memory element 150.

c. The setting signal Vs may have any voltage, current, frequency, or other characteristic suitable to change the behavior of the transfer function of node 100. For example, the setting signal Vs can combine with other inputs of the transfer function element 120 to alter the output signal of the node in a desired manner.

d. Variable sensitivity nodes can include any combination of circuitry suitable for the purposes of this disclosure. For example, FIG. 2 shows a diagram of example circuitry of a variable sensitivity node 100, according to embodiments of this disclosure. The one or more input channels 110 can include first input channel 111 and second input channel 112. The transfer function element 120 can include any combination of circuitry suitable to map input signals to desired output signals. For example, transfer function element 120 can include circuitry suitable to multiply input signals, accumulate input signals, perform sigmoidal operations on signals, delay input signals, or any other operations of a node within an ANN that are suitable for the purposes of this disclosure. The combination of gate 121 and gate 122 is an example combination of circuitry that can make up transfer function element 120. As a further example, transfer function element 120 can include gates suitable to perform logical operations such as conjunction operations ("AND"), disjunction operations ("OR"), negation operations ("NOT"), exclusive or operations ("XOR"), biconditional operations ("XNOR"), negative conjunction operations ("NAND"), and other logical operations suitable for the purposes of this disclosure.

e. Transfer function element 120 can also be coupled to control channel 113. Control channel 113 can change the operation of transfer function element 120 in accordance with any technique suitable for the purposes of this disclosure, such as any those techniques described below. Transfer function element 120 can also be coupled to the voltage supply of the ANN and receive positive supply voltage Vdd via positive supply voltage channel 170 and negative supply voltage Vss via negative supply voltage channel 171. The memory element 150 setting signal Vs modifies the positive supply voltage Vdd at node 123 and negative supply voltage Vss at node 124.

f. Memory element 150 can include any combination of circuitry suitable to store an analog and/or digital setting signal Vs. For example, as seen in FIG. 3, memory element 150 can include a set of transistors and/or other components that may store a charge, such as electrically erasable programmable read-only memory cells and/or flash memory cells. As another example, memory element 150 can be a single memory cell that is made out of two components. One component can be a first metal-oxide semiconductor, field-effect transistor ("MOSFET") that controls the current, max voltage, and/or frequency during the rising edge of the output signal of node 100. A second component can be a second MOSFET that is used to insulate the gate of the first MOSFET from the control voltage of node 100 and employ a gate parasitic capacitance that functions like a charge storage component.

g. Control channel 113 may receive a control signal that changes the operation of one or more of the components of transfer function element 120, such as gates 121 and/or 122. For example, as shown, gate 121 may be an XOR gate and gate 122 may be an AND gate. Control channel 113 and first input channel 112 may be coupled to AND gate 122. An AND gate has no output unless both inputs are high. Thus, if the control signal is not activated, then no output is possible from gate 122. If the output of the AND gate functions as an input to other gates in the node, then the control signal can function to permit or prevent inputs for the other gates in the node as well. For example, the output of gate 122 may be an input to gate 121 along with first input channel 111. Gate 121 may be an XOR gate, which always has an output, other than when both inputs are low. When the control input signal received on control channel 113 is low, the combination of gates 121 and 122 cause the output of transfer function element 120 to be the input signal received via first input channel 111. In contrast, when the control input signal received on control channel 113 is high, the combination of gates 121 and 122 cause the output of transfer function element 120 to be the output of the XOR operation on the input signals received over first input channel 111 and second input channel 112. This control functionality allows the ANN to achieve different logical sensitivities to input data.

h. In some embodiments there may be a single bit control signal for each node. For example, an ANN may have 1024 nodes and the control signal may have 1024 bits, with one bit for each node. This allows for $2^{1024}$ different configurations on a single ASIC. In some embodiments, the control signal can be a control word that can be latched and/or stored using address elements, such as those discussed below. More generally, any combination of hardware and/or software suitable for the purposes of this disclosure may be employed to activate, deactivate, or otherwise control nodes of an ANN, according to embodiments of this disclosure.

i. Multiple variable sensitivity nodes can be arranged within an ANN in any combination suitable for the purposes of this disclosure and addressed in accordance with any addressing techniques suitable for the purposes of this disclosure. For example, FIG. 4 shows a diagram of an example array 180 of variable sensitivity nodes 100-103, according to embodiments of this disclosure. Node 100 can be coupled to crossbar array 180 at row i, column j; node 101 can be coupled to array 180 at row i, column j+1; node 102 can be coupled to array 180 at row i+1, column j; and node 103 can be coupled to array 180 at row i+1, column j+1. Individual nodes can be specifically addressed by addressing elements 190-193. For example, addressing elements 190-193 may be AND gates that only provide a signal to the node when a specific row and column in array 180 receives a signal. As an example, the addressing element for a particular node 100-103 may be coupled to a setting channel, a control channel, and/or other channel of the particular node such that a particular transfer function setting or control signal is provided to the particular node and not other nodes in array 180. In this way, a particular transfer function setting and/or control signal can be provided to a particular node, when such node is properly addressed. When signal S is high the capacitor C is allowed to charge or discharge to match Vc. Capacitor C stores the gate voltage M1. The gate voltage determines how much voltage is dropped across drain and source of M1, and therefore determines Vs.

j. Transfer function setting signals, control signals, input signals, or other signals for nodes 100-103 can be provided in digital and/or analog format, according to embodiments of this disclosure. For example, setting signals and control signals may be initially provided as a digital signal from a computing device in communication with nodes 100-103. The computing device may be, for example, any of the computing devices discussed below with respect to FIG. 12.

k. The ASIC on which nodes 100-103 can be embedded can include one or more digital-to-analog converters ("DACs"). For example, a DAC can be coupled to each node 100-103 individually; a DAC can be coupled to each column j, j+1, . . . , j+n; and/or one or more DACs can be grouped in any other configuration suitable for the purposes of this disclosure. The digital signals provided to a DAC can be converted by the DAC to analog signals before being provided for analog processing by ANN nodes, such as any of nodes 100-103. A DAC can include any combination of hardware and/or software suitable for the purposes of this disclosure. In some embodiments the transfer function setting signal can be provided as a digital signal with a p-byte bus through a serial communication channel or encoded in the digital pulse duration. This digital setting signal can then be converted to an analog signal before being processed as an analog signal by an ANN node. In some embodiments ANN nodes can process digital signals or combinations of digital and analog signals.

Figure 5:
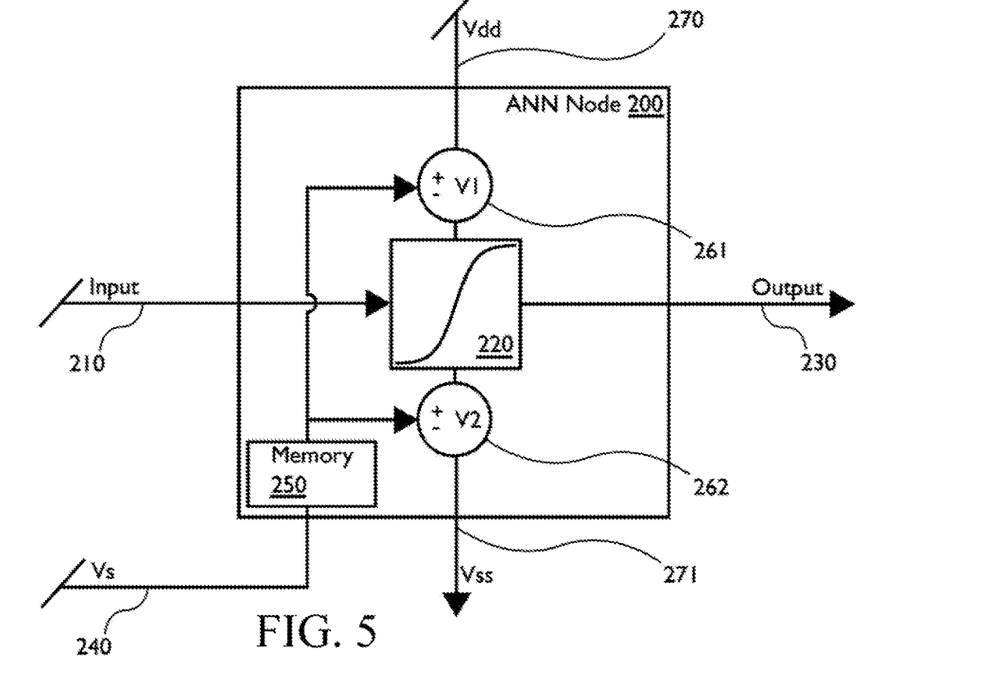
FIG. 5 shows a diagram of an example variable sensitivity node having voltage offset elements, according to embodiments of this disclosure.
Figure 6:
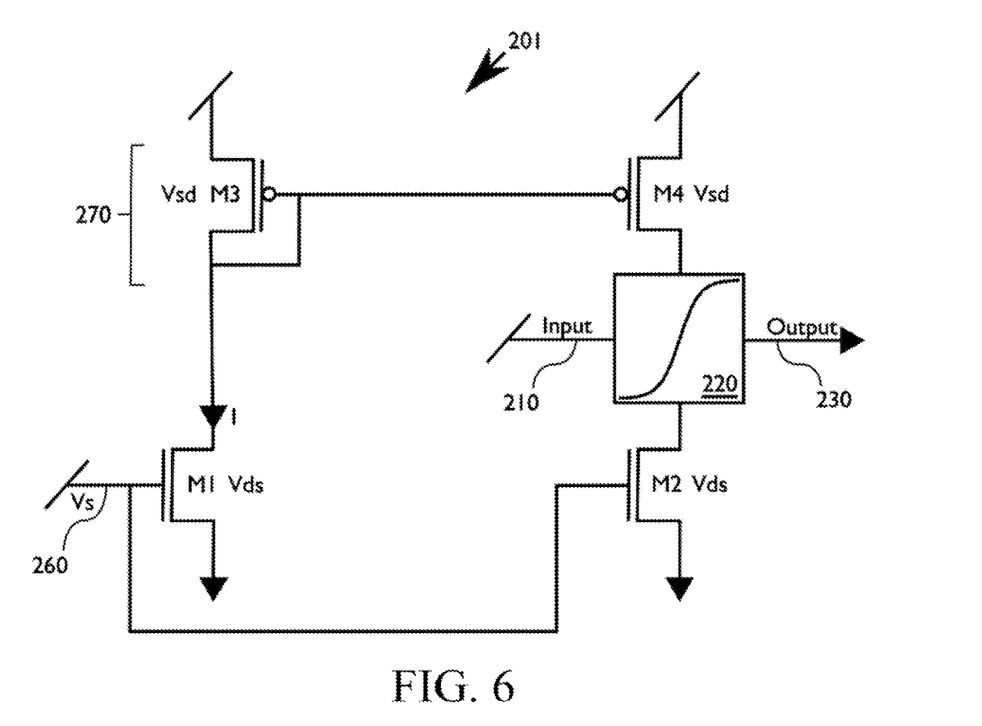
FIG. 6 shows a diagram of example circuitry of a variable sensitivity node having voltage offset elements, according to embodiments of this disclosure.

Voltage Offset Functionality l. According to embodiments of this disclosure, some circuits that make up a transfer function element can change the steepness, minimum bound, and/or maximum bound of the transfer function when power and ground voltages change. For example, some nodes can introduce voltage offset elements, above and below the transfer function element so that the effective supply to the transfer function element is Vdd−V1 and Vss+V2. In embodiments where V1 is less than V2, the transfer function can be asymmetrical. In embodiments where V1 is equal to V2, the transfer function can be substantially symmetrical about the midpoint of the transfer function.

m. FIG. 5 shows a diagram of an example variable sensitivity node 200 having voltage offset element 261 providing voltage offset V1 and voltage offset element 262 providing voltage offset V2, according to embodiments of this disclosure. As shown, node 200 can receive an input signal via input channel 210 and provide an output signal via output channel 230. Node 200 can include transfer function element 220 that can transmit positive supply voltage Vdd via positive supply channel 270 and negative supply voltage Vss via negative supply channel 271. Transfer function element 220 can process input signals based the transfer function setting signal Vs received via setting channel 240 and stored in memory element 250.

n. Embodiments of this disclosure may include any suitable combination of circuitry for providing offset voltage functionality. For example, FIG. 6 shows a diagram of example circuitry 201 of a variable sensitivity node 200 having voltage offset elements, according to embodiments of this disclosure. As shown, current I of circuit 201 can be set by voltage of Vs. Circuit 201 can include MOSFETs M1, M2, M3, and M4; transfer function element 220; input channel 210, and output channel 230. The drain-source voltage Vds of M1 and source-drain voltage Vsd of M3 can be set by current I of circuit 201. M3 and M4 can function as a current mirror 270 that copies I to the right-hand side of circuit 201. As a result, circuit 201 can provide voltage offsets V1 and V2 as shown in FIG. 5. For example, the source-drain voltage Vsd of M4 can function as voltage offset element 261 providing voltage offset V1 and drain-source voltage Vds of M2 can function as voltage offset element 262 providing voltage offset V2.

Figure 7:
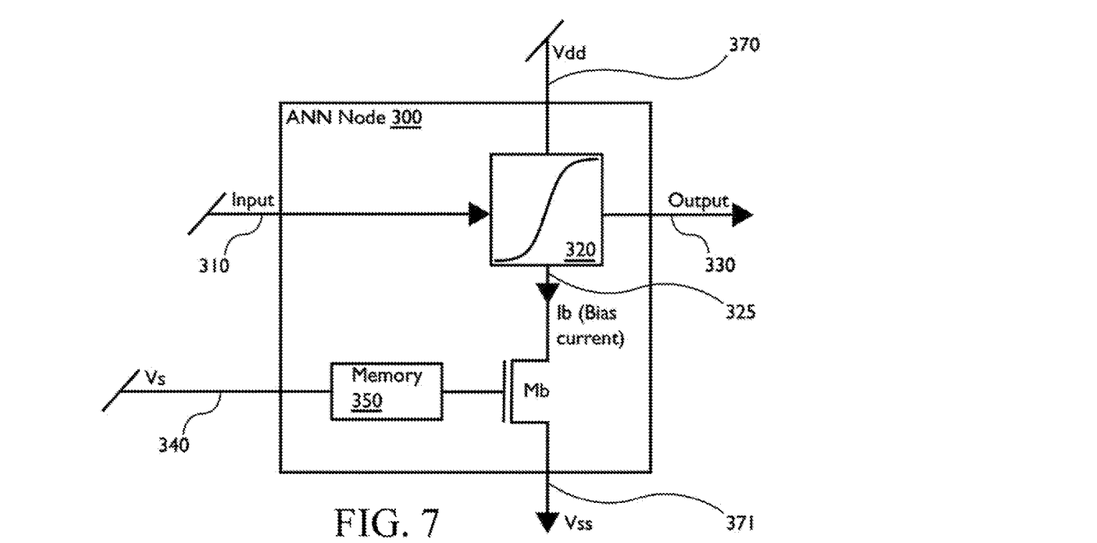
FIG. 7 shows a diagram of an example variable sensitivity node having bias current functionality, according to embodiments of this disclosure.
Figure 8:
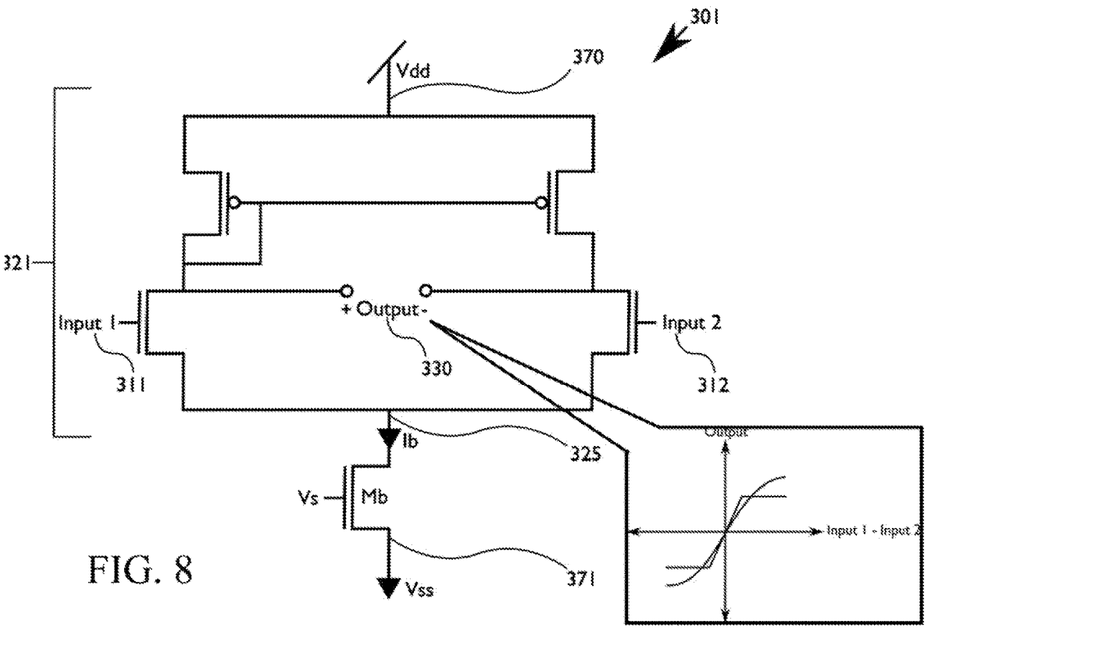
FIG. 8 shows a diagram of example circuitry for a variable sensitivity node having bias current functionality, according to embodiments of this disclosure.
Figure 9:
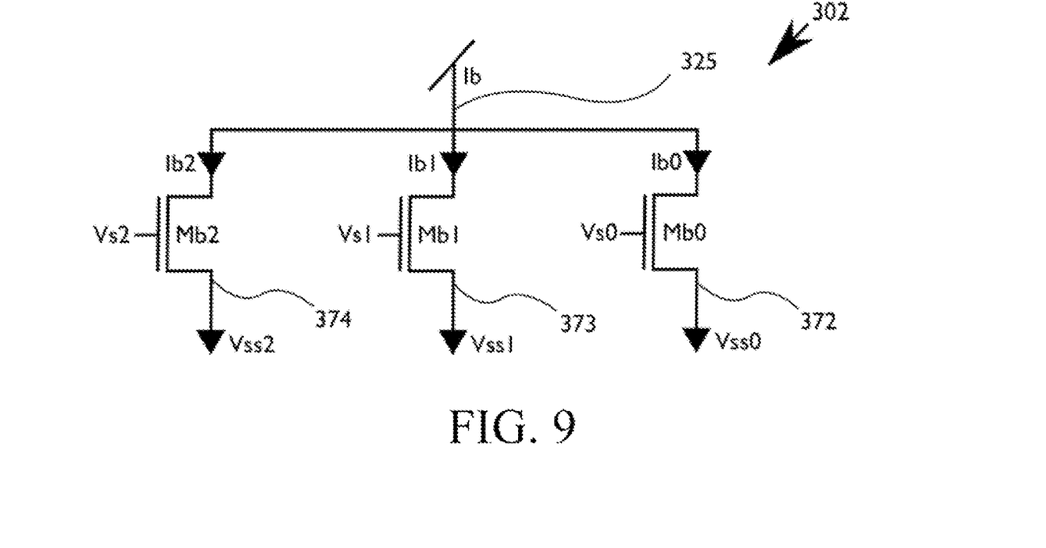
FIG. 9 shows a diagram of example circuitry for a multi-bit digital signal variable sensitivity node having bias current functionality, according to embodiments of this disclosure.

Bias Current Functionality o. According to embodiments of this disclosure, some circuits that make up a transfer function element can change a transfer function by employing a bias current. For example, FIG. 7 shows a diagram of an example variable sensitivity node 300 having bias current functionality, according to embodiments of this disclosure. As shown, node 300 can receive an input signal via input channel 310 and provide an output signal via output channel 330. Node 300 can include transfer function element 320 that can be coupled to positive supply channel Vdd, 370. Transfer function element 320 can process input signals based the transfer function setting signal Vs received via setting channel 340 and stored in memory element 350. Bias current channel 325 can couple transfer function element 320 to base transistor Mb. Bias current Ib can be set by elements such as bias transistor Mb to influence the transfer function of node 300. Negative supply voltage Vss can be transmitted via negative supply channel 371 coupled to bias transistor Mb.

p. Embodiments of this disclosure may include any suitable combination of circuitry for providing bias current functionality. For example, FIG. 8 shows a diagram of example circuitry for a variable sensitivity node 301 having bias current functionality, according to embodiments of this disclosure. As shown, node 301 can include a transimpedance amplifier to provide bias current functionality. The elements within region 321 can make up the transfer function element of node 301. As shown, node 301 can receive an input signal via input channels 311 and 312 and provide an output signal via output channel 330. Transfer function element 320 can receive positive supply voltage Vdd via positive supply channel 370. The bias current Ib 325 from the transfer function element 321 can be set by bias transistor Mb. Bias transistor Mb can be coupled to the channel carrying setting signal Vs and source channel 371 carrying negative supply Vss. As seen in the inset (lower right) circuitry shown in node 301 can result in a slope of the transfer function of transfer function element 321 being proportional to the bias current Ib and the square of the voltage of the setting signal Vs. Thus, the transfer function can by adjusted by changing the setting signal Vs.

q. Embodiments of this disclosure may include any suitable combination of circuitry for providing bias current functionality, including multi-bit digital signals for mixed-precision applications. For example, FIG. 9 shows a diagram of example circuit 302 for a multi-bit digital signal variable sensitivity node having bias current functionality, according to embodiments of this disclosure. As shown, circuit 302 can include bias current channel 325 carrying a bias current Ib, which can branch into a set of channels carrying bias current components Ib0, Ib1, and Ib2, where Ib=Ib2+Ib1+Ib0. In such embodiments the influence of the bias current component on the transfer function of the transfer function element to which circuit 302 is connected can relate to the quantity of current, such as where Ib2>Ib1>Ib0. In such embodiments, Ib2 can be the most significant bit and Ib0 can be the least significant bit in the total signal. Each channel carrying a bias current component Ib0, Ib1, and Ib2 can be coupled to one of bias transistors Mb0, Mb1, and Mb2. Each bias transistor Mb0, Mb1, and Mb2 can be coupled to a respective channel carrying a setting signal Vs0, Vs1, and Vs2 and a respective source channel 372, 373, and 374 carrying negative supply Vss0, Vss1, and Vss2. The transistor widths can determine a transistor current for given transistor Mb0, Mb1, and Mb2 given a specified overdrive voltage Vod for the transistor, where Vod=[transistor's source and gate voltage Vsg]−[transistor's threshold voltage Vth].

Figure 10:
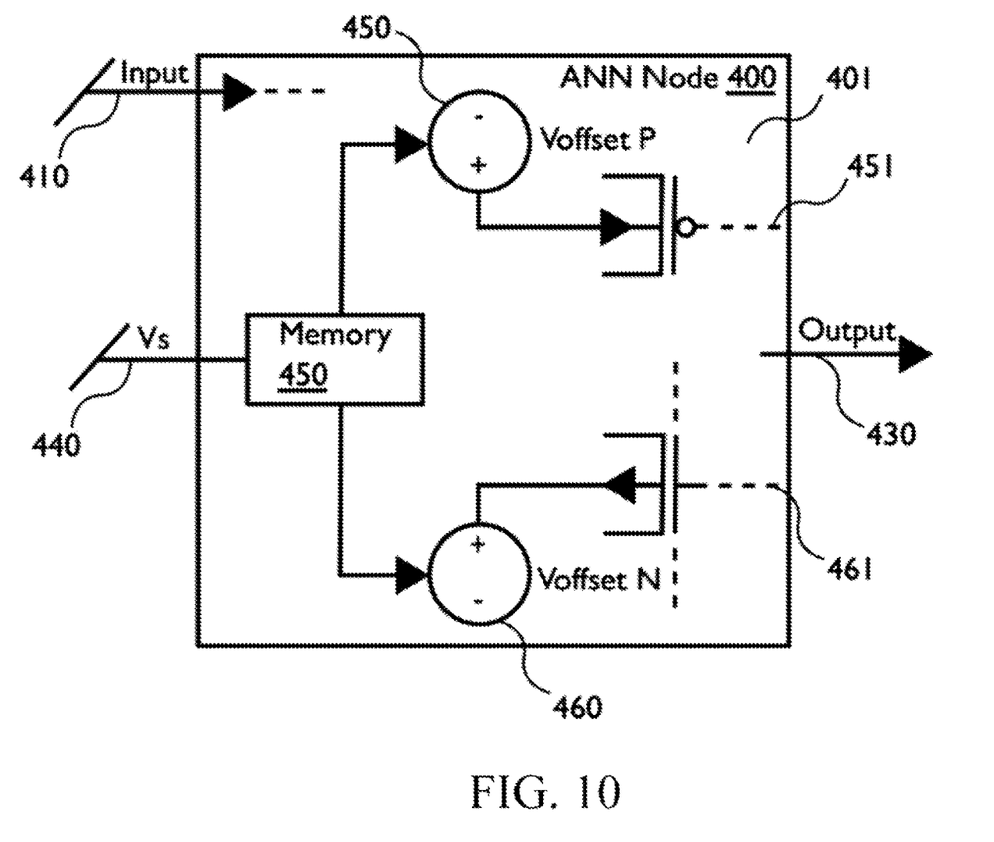
FIG. 10 shows a diagram of an example variable sensitivity node having substrate threshold voltage functionality, according to embodiments of this disclosure.

Substrate Threshold Voltage Functionality r. In MOSFETs, the current can be determined by device parameters such as the overdrive voltage Vod, source and gate voltage Vsg, and threshold voltage Vth. Thus, the current provided by a MOSFET and the behavior of the transfer function of an ANN node composed of MOSFETs can be influenced by adjusting these device parameters. The threshold voltage Vth can be adjusted by taking advantage of the body effect by introducing an offset voltage to the substrate upon which a MOSFET is embedded. For example, FIG. 10 shows a diagram of an example variable sensitivity node 400 having substrate threshold voltage functionality, according to embodiments of this disclosure. Node 400 can include input channel 410 and output channel 430, each coupled to a transfer function element (not shown). The transfer function element can be made up of the P-channel MOSFETs 451 and N-channel MOSFETs 461 in node 400. Setting channel 440 can couple to memory element 450. Memory element 450 can store a transfer function setting and couple to P-channel voltage offset element 450 and N-channel voltage offset element 460, each embedded in substrate 401. P-channel voltage offset element 450 can be coupled to P-channel MOSFETs 451 within node 400, and N-channel voltage offset element 460 can be coupled to N-channel MOSFETs 461 within node 400.

s. A voltage offset can be introduced to substrate 401 by introducing a setting signal Vs from memory element 450 via P-channel voltage offset element 450 and N-channel voltage offset element 460. This voltage offset can change the bulk voltage of substrate 401 and thus the threshold voltage of all MOSFETs in node 400. By changing the threshold voltage of the MOSFETs in node 400 that make up the transfer function element, the transfer function of node 400 can be changed to exhibit a desired behavior, according to embodiments of this disclosure.

Figure 11:
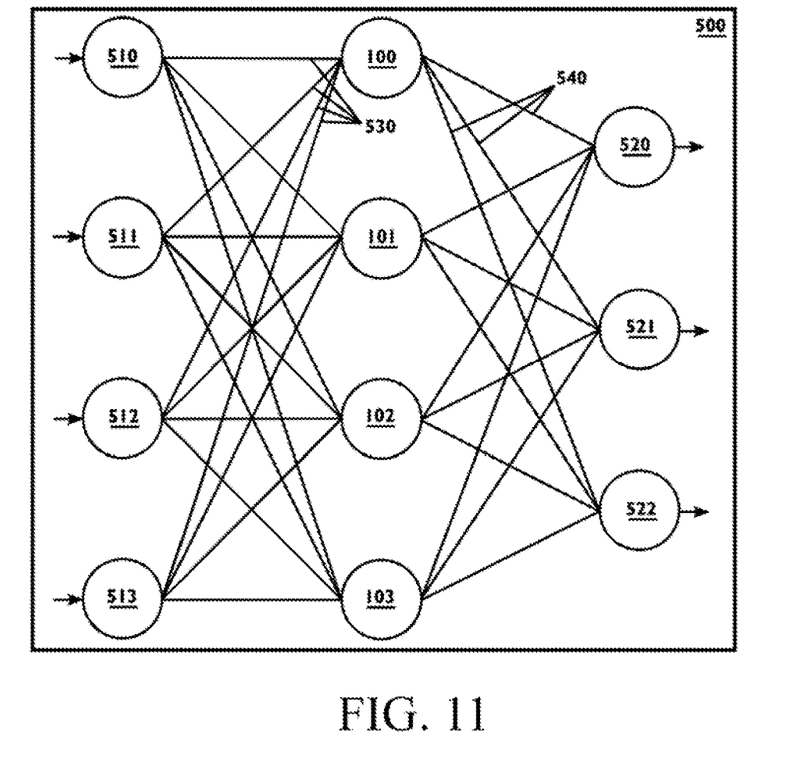
FIG. 11 shows a diagram of an example artificial neural network, according to embodiments of this disclosure.

ANNs t. A set of variable sensitivity nodes, such as array 300, can form a variety of types of ANNs implemented in a hard-wired, integrated circuits, according to embodiments of this disclosure. For example, FIG. 11 shows a system diagram of an example feed forward ANN 500 implemented in a hard-wired, integrated circuit, according to embodiments of this disclosure. ANN 500 can include an input layer composed of nodes 510-513, one or more hidden layers composed of nodes such as nodes 100-103, and an output layer composed of nodes 520-522. Each of nodes 510-513, 100-103, and 520-522 can include any combination of circuitry suitable for the purposes of this disclosure, such as any of the circuitry shown in FIGS. 1-10. Each of the nodes in ANN 500 can be connected to one or more other nodes of ANN 500 by interconnect channels, such as input interconnects 530 and output interconnects 540 of node 100. Interconnect channels of ANN 500 can be formed from any substance suitable for connecting elements of ANN 500, such as copper, polysilicon, and/or aluminum wires or lines.

u. The nodes of ANN 500 can each have a variable number of inputs, can receive a variable number of transfer function settings and/or control signals, and can generate variable outputs. Accordingly, each node 510-513 of the input layer of ANN 500 is shown having one input and four output interconnects; each node 100-103 of the one or more hidden layers of ANN 500 is shown having four input interconnects and four output interconnects; and each node 510-512 of the output layer of ANN 500 is shown having three input interconnects and one output. Nodes of ANNs according to embodiments of this disclosure may have any number and configuration of interconnects suitable for the purposes of this disclosure. In addition, recurrent neural networks with feedback connections may also be constructed.

ASICs v. Hardwired, integrated circuits, according to embodiments of this disclosure, may have any configuration suitable for the purpose of this disclosure. For example, a hardwired, integrated circuit may be an ASIC or may be hybrid devices having distinct regions that include memory component, a bus, an input/output interface, a network interface, a central processing unit ("CPU"), a graphical processing unit ("GPU"), other microprocessors suitable for the purposes of this disclosure, and/or other components suitable for the purposes of this disclosure.

w. All of the components shown in FIGS. 1-10 can be printed, embedded, or otherwise integrated onto any substrate suitable for the purposes of this disclosure, such as silicon. Any technique suitable for the purposes of this disclosure may be performed for integrating the components of FIGS. 1-10 into such substrate. For example, such components maybe printed on a silicon substrate using ultraviolet lithography techniques.

Figure 12:
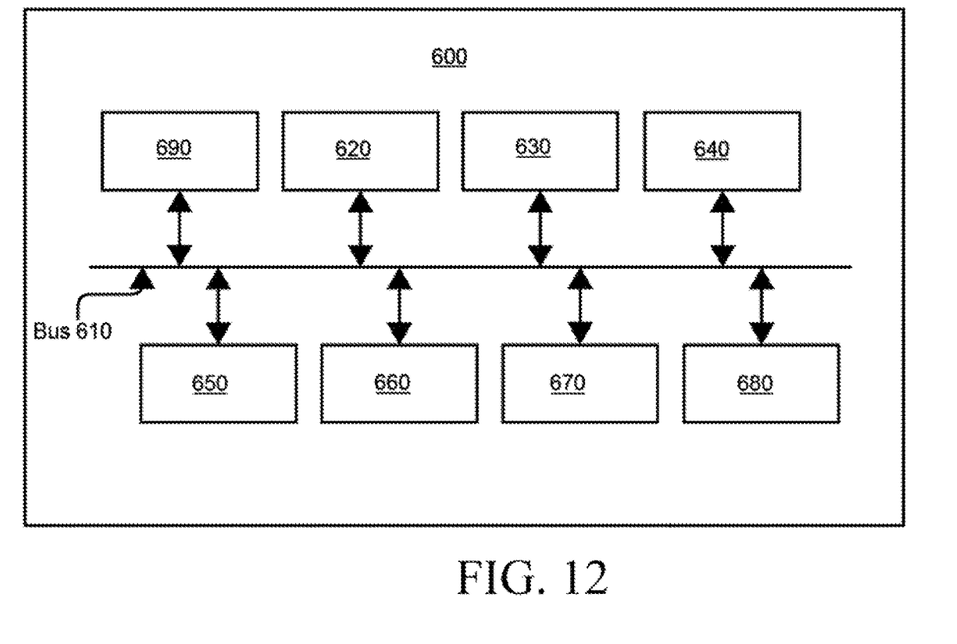
FIG. 12 shows a diagram of an example computing device, according to embodiments of this disclosure.
Figure 13:
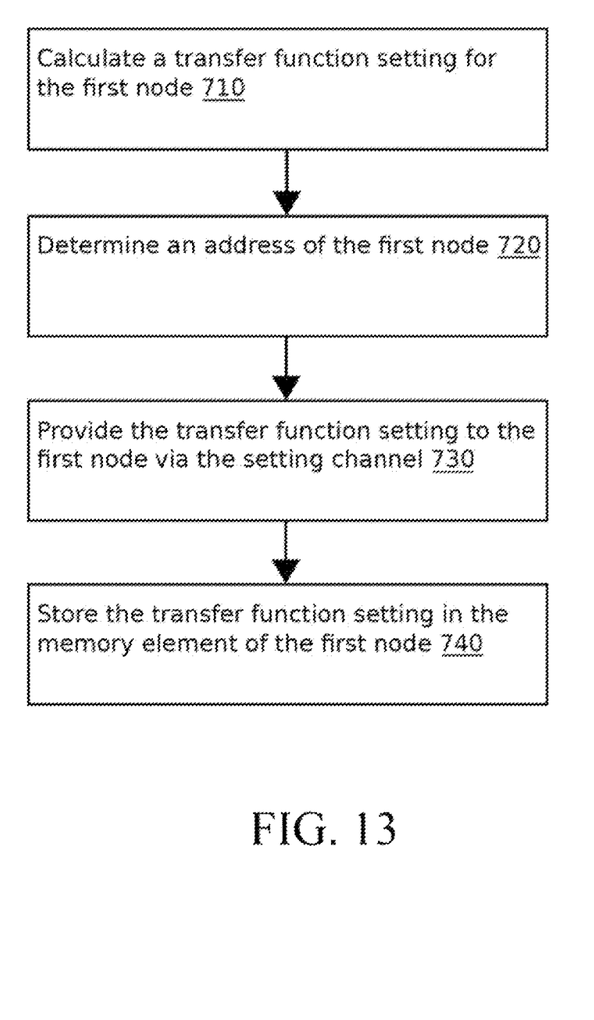
FIG. 13 shows diagram of an example procedure for providing a transfer function setting to a node of an artificial neural network, according to embodiments of this disclosure.
Figure 14:
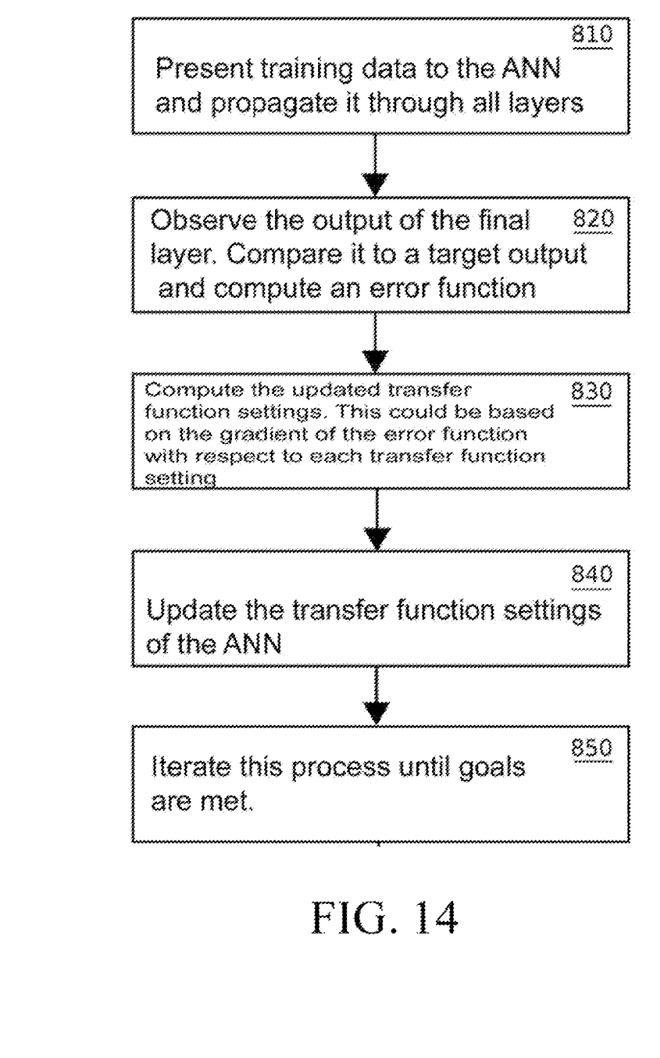
FIG. 14 shows a diagram of an example procedure for training an artificial neural network having variable sensitivity nodes, according to embodiments of this disclosure.

Operation and Training x. Applications of ANNs described herein generally will require training or otherwise configuring the ANN based on a particular data set. Embodiments of this disclosure may be implemented in a system with other components suitable for configuring and training ANNs and for providing novel data to ANNs for processing. For example, FIG. 12 shows a diagram of an example computing device 600, which may be in communication with an ANN and execute operations to configure, train, and operate the ANN, according to embodiments of this disclosure.

y. Computing devices, such as computing device 600, can include computers, servers, mainframes, desktops, laptops, tablets, smart phones, wearable devices, and other data processing devices. Computing device 600 can include a bus 610 that connects major components of the computing device 600. Major components can include: CPU 620 (which can include a processor that includes circuitry for arithmetic logic units, control units, and/or processor registers); memory 630 (which can include random access memory ("RAM"), read-only memory ("ROM"), flash RAM, or other volatile or non-volatile memory components); input/output controller 640; user display 650 (which can include a display screen via a display adapter); user input interface 660 (which can include one or more controllers and associated user input devices such as a keyboard, mouse, touch screen, microphone, or camera, and can be closely coupled to the input/output controller 640); fixed storage 670 (which can include, a hard drive, flash storage, fiber channel device, storage area network device, advanced technology attachment ("ATA") device, serial ATA device, small computer system interface ("SCSI") device, serial attached SCSI device, or other non-volatile physical storage device); removable media component 680 operative to receive and control an optical disk, flash drive, or other removable media, and network interface 690.

z. Bus 610 allows data communication between the CPU 620 and the memory 630, which can include ROM or flash memory (neither shown), and RAM, as previously noted. RAM is generally the main memory into which the operating system and application programs are loaded. The RAM, ROM or flash memory can contain, among other code, boot-up instructions and the basic input/output system which controls basic hardware operation such as the interaction with peripheral components. Applications resident with the computing device 600 are generally stored on and accessed via a computer-readable medium, such as a fixed storage 670 or removable media 680.

aa. Many other devices or components can be connected to computing device 600 or other integrated circuitry described in this disclosure in a similar manner (e.g., imaging devices, biometric devices, actuators, sensors, document scanners, digital cameras, virtual reality devices, and other devices that interact with computing devices and integrated circuitry). Conversely, all the components shown FIG. 12 need not be present to practice embodiments of this disclosure. The components of FIG. 12 can be interconnected in different ways from that shown. Code or instructions for operation of embodiments of this disclosure can be stored in computer-readable storage media such as one or more of memory 630, fixed storage 670, and removable media 680 that are local or integrated with computing device 600 or located remote from computing device 600.

bb. Network interface 690 may provide a direct connection to a remote server via a telephone link, the Internet via an internet service provider, or a direct connection to a remote server via a direct network link to the Internet via a point of presence or other network connection technique. The network interface 690 may provide such connection using wireless techniques, including near field communication connections, Bluetooth connections, digital cellular telephone connections, cellular digital packet data connections, digital satellite data connections, or other communication techniques. For example, the network interface 690 may allow computing device 600 to communicate with other computing devices via one or more networks suitable for the purposes of this disclosure.

cc. Embodiments of ANNs having variable sensitivity nodes can be used in a wide variety of applications. Generally, transfer function settings will first be provided to all nodes in the ANN. FIG. 13 shows a diagram of an example procedure for providing a transfer function setting to a node of an artificial neural network, according to embodiments of this disclosure.

dd. A processor can calculate a transfer function setting for a first node at 710. For example, a processor can be coupled to memory storing an initial configuration state for the ANN, and can access a transfer functions setting for the first node maintained in the initial configuration state. The processor can determine an address for the first node at 720. For example, the processor can access an address for the node maintained in the initial configuration state. The processor can then provide the transfer function setting to the first node via the first node's setting channel at 730 based on the address. At 740 the processor can store the transfer function setting at the node, such as by storing the transfer function setting in a memory element of the node.

ee. Procedures, such as those described in FIG. 13 can be employed to set transfer function settings for some or all nodes in a ANN. In some embodiments, the transfer function settings may be updated via training such that nodes of the ANN will have a trained set of transfer function settings that cause the ANN to behave in a desired manner when provided novel input signals. In other embodiments all nodes may be provided the same transfer function settings and thus have equal transfer functions or have randomized transfer function settings. More generally, any procedures suitable for the purposes of this disclosure may be employed to set transfer function settings of nodes of an ANN, according to embodiments of this disclosure.

ff. Additional configuration operations may be performed by ANNs having variable sensitivity nodes, according to embodiments of this disclosure. For example, a processor can provide a control signal to nodes of the ANN via each node's control channel. As described above, the control signal may change an operation of a node. For example, the control channel may be one of two inputs to an AND logic gate in a node. If the control signal is not activated, then no output is possible from the AND gate because AND gates only have outputs when both inputs are high. If the output of the AND gate functions as an input to other gates in the node, then the control signal can function to permit or prevent inputs for the other gates in the node as well.

gg. Any combination of connections between the control signal and components of nodes that is suitable to control operation of an ANN may be employed, according to embodiments of this disclosure. In some embodiments there may be a single bit control signal for each node. For example, an ANN may have 1024 nodes and the control signal may have 1024 bits, or one bit for each node. More generally, any procedures suitable for the purposes of this disclosure may be employed to activate, deactivate, or otherwise control nodes of an ANN, according to embodiments of this disclosure.

hh. Applications of an ANN generally will require training or otherwise configuring the ANN based on a particular data set. Training may be conducted in accordance with supervised techniques, unsupervised techniques, reinforcement techniques, or any other training technique, suitable for the purposes of this disclosure.

ii. FIG. 13 shows a diagram of an example procedure for training an ANN having variable sensitivity nodes, according to embodiments of this disclosure. A first layer of an ANN receives an input signal at 810. For example, an ANN may be configured such that the nodes of all layers in the ANN propagate received signals forward to nodes of subsequent layers in the ANN and do not cycle the signal backwards to nodes that have already received the signal. Such ANNs can be described as feedforward ANNs and the signals that propagate through feedforward ANNs from the source layer to the output layer can be described as feedforward signals.

jj. The first layer that receives the feedforward signal can process the feedforward signal at 820 and provide the feedforward signal to a second node in a subsequent layer of the ANN at 830. A similar process may take place at all nodes of the ANN until the feedforward signal propagates through the ANN to the output layer.

kk. The output of the output layer of the ANN can be processed using training data to optimize the transfer functions of the nodes of the ANN. For example, the signals output from the output layer may be compared to signals associated with training data for the ANN. A cost function for the ANN may be minimized by calculating the gradient of each layer of the ANN working backwards from the output layer to the input layer. In general, any technique suitable for the purposes of this disclosure may be used for optimizing the transfer functions of nodes of an ANN having variable sensitivity nodes. At 840, a processor may calculate an updated transfer function setting for the first node using such optimization techniques. The processor may provide the updated transfer function setting to the first node at 850, and at 860, the updated transfer function setting may be stored in the memory element of the first node.

ll. Processors executing procedures, such as those disclosed in FIGS. 13 and 14 may be separate computing devices, such as those disclosed with respect to FIG. 6, according to embodiments of this disclosure. Such separate computing devices may be connected to the ANN by any communications components and transmission mediums suitable for the purposes of this disclosure. In other embodiments, the processor for executing procedures may be on the same substrate as the ANN, including in embodiments where the nodes of the ANN and the processor are embedded on a single integrated circuit. For example, a CPU, GPU, or other microprocessor may be located on a first region of an integrated circuit device and execute instructions stored in memory located on a second region of the integrated circuit that provide signals to the nodes of an ANN located on a third region of the integrated circuit. More generally, embodiments of this disclosure may be implemented in a combination of hardware and/or software suitable for the purposes of this disclosure.

Other Components mm. In general, various embodiments of this disclosure can include computer-implemented procedures or processes and apparatuses for practicing those procedures or processes. Embodiments of this disclosure can also be implemented in the form of a computer program product having program code or instructions encoded thereon. Program code or instructions can be stored in non-transitory, computer-readable media, such as floppy diskettes, optical disks, hard drives, universal serial bus drives, or any other machine-readable storage medium. When the program code or instructions are loaded into and executed by a computing device, the computing device becomes an apparatus for practicing embodiments of this disclosure. In addition, program code or instructions can be stored in a remote storage medium and transmitted over a transmission medium, such as electrical wiring, cabling, or fiber optics, or via electromagnetic radiation to a computing device, and when the program code or instructions are loaded into and executed by the computing device, the computing device becomes an apparatus for practicing embodiments of this disclosure.

nn. According to embodiments of this disclosure, when program code or instructions are executed on one or more general-purpose processors (such as on one or more CPUs, microprocessors, or other general-purpose integrated circuits having one or more processing cores) segments of the program code or instructions can configure the one or more general-purpose processors to create specific logic circuits. In some embodiments, program code or instructions stored on a computer-readable storage medium can be executed by a general-purpose processor, which can transform the general-purpose processor or a device containing the general-purpose processor into a special-purpose device configured to implement or carry out the computer code or instructions.

oo. All or part of embodiments of this disclosure can be embodied in hardware and/or firmware that include integrated circuits such as microprocessors, digital signal processors, microcontrollers, ASICs, field programmable gate arrays, GPUs, systems on a chip, three dimensional integrated circuits, programmable array logic, programmable logic arrays, field programmable logic arrays, electrically programmable logic devices, electrically erasable programmable logic devices, logic cell arrays, application specific standard products, or any other integrated circuitry suitable for the purposes of this disclosure.

pp. The devices described herein may be part of a data processing system that includes one or more of a processor, memory, input/output circuitry, and peripheral devices. The data processing system can be used in a wide variety of applications, such as computer networking, data networking, instrumentation, video processing, digital signal processing, or any other application suitable for the purposes of this disclosure. The devices described herein can be used to perform a variety of different logic functions in conjunction with such data processing systems. For example, the devices disclosed herein can be configured as a processor or controller that works in cooperation with a processor of the data processing system. The device may also be used as an arbiter for arbitrating access to a shared resource in the data processing system. In another example, the device can be configured as an interface between a processor and one of the other components in the data processing system.

qq. It should now be apparent that the above-described variable sensitivity node can be implemented as an information processing device such as an ASIC, can be adjusted simply by applying immediate weights or parameters that change and/or amplify or de-amplify the output of the nodes, and thereby substantially increase the speed of processing of signals propagating through the ANN.

rr. Although components of embodiments of this disclosure are shown in specific arrangements and combinations, this disclosure contemplates any other arrangement or combination of components or subcomponents, which are suitable for the purposes of this disclosure and operate in a desired way. The specification and drawings are to be regarded in an illustrative rather than exhaustive or to limit the invention to the precise forms disclosed. Many variations and modifications of the embodiments described herein will be obvious to one of ordinary skill in the art in light of the above disclosure. Similarly, although the operations described in this disclosure may be described in a specific order, other operations may be performed in-between described operations. Operations described herein may also be adjusted so that they occur at different times or described operations may be distributed in a system which allows the occurrence of the operations at various intervals, as long as the processing of the overall operations are performed in a desired way. Accordingly, the scope of the invention is to be defined only by the claims, and by their equivalents.

What is claimed is:

1. A neural network having a plurality of network input channels and at least one network output channel, said neural network comprising a node coupled between said plurality of network input channels and said at least one network output channel and configured for receiving an input signal and generating a corresponding output signal therefrom, said node further comprising,
a parameter setting channel;
a transfer function configured to translate the input signal to said output signal based on a mathematical model, said transfer function comprising a mathematical relationship that includes a parameter setting;
a parameter-setting element configured to generate a parameter setting based on an input signal to said parameter setting channel, the parameter setting comprising at least one of a threshold voltage, an overdrive voltage, a source voltage, a gate voltage, a positive supply voltage, and a negative supply voltage;
whereby a predetermined input to said parameter setting element is capable of changing said parameter setting and altering the mathematical relationship of said transfer function while the neural network is processing an input from the plurality of network input channels.

2. The neural network recited in claim 1 wherein said parameter setting element is a non-transitory memory connected to said parameter setting channel, in communication with said transfer function, and configured to store one or more values for determination of said parameter setting.

3. The neural network recited in claim 2 wherein said parameter setting comprises a Boolean value.

4. The neural network recited in claim 2 wherein said parameter setting comprises a voltage level.

5. The neural network recited in claim 4 wherein said parameter setting comprises two offsetting voltages.

6. The neural network recited in claim 2 wherein said parameter setting comprises a bias current level.

7. The neural network recited in claim 1 wherein said transfer function element comprises at least one logic gate configured to perform a logical operation.

8. The neural network recited in claim 7 wherein said logical operation comprises any one or more from among a group consisting of conjunction ("AND"), disjunction ("OR"), negation ("NOT"), exclusion ("XOR"), biconditional ("XNOR"), negative conjunction ("NAND").

9. The neural network recited in claim 1 further comprising a plurality of said nodes.

10. The neural network recited in claim 9, wherein said parameter setting comprises a Boolean value having said plurality of bits, one bit for each of said plurality of nodes.

11. The neural network recited in claim 9 further comprising 1024 of said nodes.

12. The neural network recited in claim 11, wherein said parameter setting comprises a Boolean value having 1024 bits, one bit for each of said 1024 nodes.

13. The neural network recited in claim 9 wherein all of said plurality of said nodes are configured on an application-specific integrated circuit (ASIC).

14. The neural network recited in claim 13 wherein all of said plurality of nodes are connected to a common parameter setting channel and yet each of said plurality of nodes is individually-addressable.

15. An information processing device configured as a node in a neural network having a plurality of network input channels and a network output channel, said information processing device being coupled between said plurality of network input channels and said network output channel and configured for receiving an input signal and generating a corresponding output signal, said information processing device further comprising,
an input setting channel;
a logic element configured to translate the input signal to said output signal based on a mathematical function that includes a parameter setting;
a parameter-setting element configured to set said parameter setting based on an input signal to said input setting channel, the parameter setting comprising at least one of a threshold voltage, an overdrive voltage, a source voltage, a gate voltage, a positive supply voltage, and a negative supply voltage;
whereby a predetermined input to said input setting channel changes said parameter setting and alters the mathematical relationship of said logic element.

16. The information processing device recited in claim 15 wherein said parameter setting element is a non-transitory memory connected to said input setting channel, in communication with said logic element, and configured to store one or more values for determination of said parameter setting.

17. The information processing device recited in claim 16 wherein said parameter setting comprises a Boolean value.

18. The information processing device recited in claim 16 wherein said parameter setting comprises a voltage level.

19. The information processing device recited in claim 18 wherein said parameter setting comprises two offsetting voltages.

20. The information processing device recited in claim 16 wherein said parameter setting comprises a bias current level.

21. The information processing device recited in claim 16 wherein said transfer function element comprises at least one logic gate configured to perform a logical operation.

22. The information processing device recited in claim 21 wherein said logical operation comprises any one or more from among a group consisting of conjunction ("AND"), disjunction ("OR"), negation ("NOT"), exclusion ("XOR"), biconditional ("XNOR"), negative conjunction ("NAND").

23. The information processing device recited in claim 16 further comprising a plurality of said nodes.

24. The information processing device recited in claim 23, wherein said parameter setting comprises a Boolean value having said plurality of bits, one bit for each of said plurality of nodes.

25. The information processing device recited in claim 24, wherein said parameter setting comprises a Boolean value having 1024 bits, one bit for each of said 1024 nodes.

26. The information processing device recited in claim 23 further comprising 1024 of said nodes.

27. The neural network recited in claim 23 wherein all of said plurality of said nodes are configured on an application-specific integrated circuit (ASIC).

28. The neural network recited in claim 23 wherein all of said plurality of nodes are connected to a common parameter setting channel and yet each of said plurality of nodes is individually-addressable.

\* \* \* \* \*